Reissued May 28, 1929. Re. 17,309

UNITED STATES PATENT OFFICE.

ARTHUR C. ZIMMERMAN, OF DAYTON, OHIO, ASSIGNOR TO THE DOW CHEMICAL COMPANY, OF MIDLAND, MICHIGAN, A CORPORATION OF MICHIGAN.

TREATMENT OF MAGNESIUM AND MAGNESIUM ALLOYS TO INHIBIT CORROSION.

No Drawing. Original No. 1,677,667, dated July 17, 1928, Serial No. 747,128, filed October 31, 1924. Application for reissue filed March 9, 1929. Serial No. 345,879.

This invention relates to the treatment of magnesium and magnesium alloys, so as to inhibit or prevent corrosion, to which metals of this type are quite susceptible.

I have discovered that if an article made of magnesium or magnesium alloys in which magnesium is present as the major constituent, is subjected to the action of a dilute solution of phosphoric acid, boric acid, borax or other borates of the alkali metals, a coating or impregnation of phosphate, borate, or other compound of magnesium likely to form under the treatment, is produced. It is also desirable to have present in the treating solution, an oxidizing salt such as manganese dioxide. As an example of a treatment which affords ample protection, the following is submitted: The material is immersed in a .75 per cent by volume solution of phosphoric acid, containing about 1 ounce of manganese dioxide per gallon of solution. At the time the metal is immersed the solution should be heated to about 200° Fahrenheit, and this temperature maintained after the immersion of the metal, which remains immersed until a continuous coating or impregnation of the dark gray colored compound of magnesium is formed, or until practically all gas ceases to be evolved from this solution. Usually about one and one-half hours are sufficient for the complete treatment of the metal in the solution.

The metal is then removed from the solution and washed with water. After the washing with water, it is heat-treated by placing it in an oven. After baking for a short time, sufficiently to thoroughly dry and stabilize the coating, it is removed and cooled to room temperature. Subsequently a coating or coatings of paint, enamel or lacquer, or combinations thereof are applied, depending upon the results desired. It has been found that, for inhibiting corrosion when exposed to the atmosphere, salt water, benzol or gasoline, two coatings of bakelite lacquer serve the purpose excellently as a finishing coating material.

Although the protection afforded by subsequent heat treating and painting is greatly improved, these two steps are not absolutely essential in the treatment of the metal. Very good results are obtained by merely subjecting the metal to the action of the phosphoric acid, boric acid or borax as the case may be, and merely washing or drying the treated metal.

It is essential that the solution of acid used be sufficiently weak so as to prevent too rapid action on the metal. In case the acid is stronger than it should be, the acid eats into the metal so rapidly that the scale or protective coating is loosened and does not rigidly adhere to the product. It has been found that a ½ to a 1 per cent solution of phosphoric acid is most desirable, but if the time is increased considerably, a weaker solution than ½ to 1 per cent may be used. Similarly it is possible to use more than a 1 per cent solution of phosphoric acid for a shorter period of time, although in such case the protective coating is not quite as integral as the coating which would be produced more slowly.

When boric acid is used in place of phosphoric acid as the treating acid, the solution should be slightly stronger than 1 per cent, as the boric acid is not quite so active an agent in attacking magnesium. Less than a 5 per cent solution however should be used. In the case of borax, it has been found that less than a 5 per cent solution should be used for the best results, but this salt also may be slightly stronger than the solution of phosphoric acid used.

The salts formed on the surface of the magnesium article treated are of an insoluble character and are quite stable and serve to adequately protect the material beneath it. They also form a surface to which the paint or lacquer may be effectively applied.

I claim:

1. The method of treating magnesium and magnesium base alloys to inhibit corrosion, comprising treating the metal with a solution of not more than five per cent phosphoric acid, containing from one-tenth to ten ounces manganese dioxide per gallon of solution for about one and one-half hours.

2. The method of treating magnesium and magnesium base alloys to inhibit corrosion, comprising treating the metal with a solution of not more than five per cent phosphoric acid, for about one and one-half hours at a temperature of about 200° Fahrenheit in the presence of from one-tenth to ten ounces manganese dioxide per gallon of solution.

3. The method of treating magnesium and magnesium base alloys to inhibit corrosion against natural and prepared agencies, comprising treating the metal with a solution of not more than five per cent phosphoric acid, until a coating and impregnation of a magnesium phosphate is formed on the surface of the metal and subsequently drying the treated metal and coating with paint or lacquer.

4. The method of treating magnesium articles comprising treating the article in a water solution of less than 5 per cent of phosphoric acid, for about one and one-half hours at about 200° Fahrenheit in the presence of from one-tenth to ten ounces manganese dioxide per gallon of solution and subsequently drying the article.

5. The method of treating magnesium and magnesium base alloys to inhibit corrosion which consists in treating the metal with a solution of phosphoric acid until a protective coating of magnesium phosphate is formed on the surface of the metal.

6. The method of treating magnesium and magnesium alloys to inhibit corrosion, which comprises converting a surface layer thereof into a compound of magnesium containing phosphorus, by surface-treating such magnesium or magnesium alloy with a phosphorus-containing agent.

7. A magnesium or magnesium alloy article provided with a closely adhering surface coating of a phosphorus compound formed in place by the inter-action of the magnesium and phosphorus compound.

8. A magnesium or magnesium alloy article provided with a closely adhering surface layer of a magnesium-phosphorus compound formed in place by the inter-action of the magnesium and an agent containing a phosphoric radical.

9. A magnesium or magnesium alloy article provided with a closely adhering surface layer of magnesium phosphate, said layer being formed in place by the inter-action of the magnesium and an agent containing the phosphoric acid.

In testimony whereof I affix my signature.

ARTHUR C. ZIMMERMAN.